Aug. 12, 1969 F. A. DIGILIO 3,460,753

SPRING ACTUATOR ARRANGEMENT

Filed Dec. 12, 1966 2 Sheets-Sheet 1

INVENTOR
FRANK A. DIGILIO

BY John J. McCormack
ATTORNEY

Aug. 12, 1969 F. A. DIGILIO 3,460,753

SPRING ACTUATOR ARRANGEMENT

Filed Dec. 12, 1966 2 Sheets-Sheet 2

INVENTOR
FRANK A. DIGILIO

BY John J. McCormick

ATTORNEY

United States Patent Office 3,460,753
Patented Aug. 12, 1969

3,460,753
SPRING ACTUATOR ARRANGEMENT

Frank A. Digilio, Medfield, Mass., assignor to Honeywell, Inc., Minneapolis, Minn., a corporation of Delaware Filed Dec. 12, 1966, Ser. No. 600,976
Int. Cl. G06k *1/02*
U.S. Cl. 234—109 10 Claims

ABSTRACT OF THE DISCLOSURE

A multi-time flexure actuator for use in a punch station adapted for selectively thrusting individual punches disposed in an array. The actuator comprises a set of flexure bars each coupled to one of the punches, means for reciprocating the flexure bars, and magnetic means for selectively positioning the flexure bars in a driving or a non-driving relationship with the reciprocating means.

Figure 1:
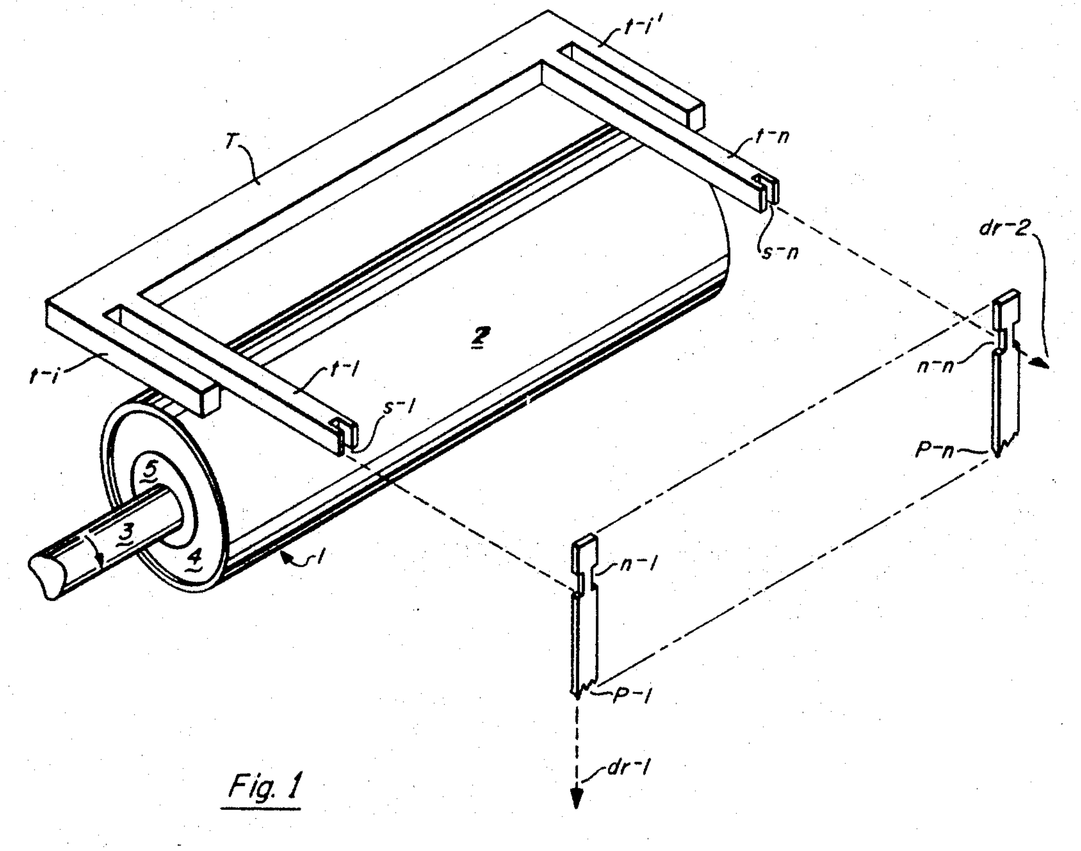

The present invention relates to resilient actuator arrangements, and more particularly to such arrangements as adapted for impressing data processing records; especially those for selectively perforating punched cards, or for like selective, high speed impressing of computer records.

In the art of providing actuator mechanisms for the manipulation of data processing records, and especially for card punches, workers in the art will recognize tht it is extremely advantageous to employ spring elements (e.g. flexures) where possible to thereby avoid troublesome abrading mechanisms such as cams, abrading pivots and the like. Abrading mechanisms are obviously attended by undue wear of parts and consequent malfunction and failure. To date, any consideration given to adapting flexure-including actuator arrangements for data processing has failed to indicate how one could substantially eliminate all such troublesome abrading elements. The present invention, however, is a step forward in this problem area, teaching a flexure actuator arrangement which is entirely free of abrading elements in the actuator linkage; and yet which functions at least as effectively as competing mechanisms having such troublesome elements.

Prior art card punch mechanisms, or related mechanisms for controllably impacting data processing records at selectable locations, have employed spring means of one sort or another, but these all have appeared to necessarily include one or more troublesome wear points; that is, an abrading surface or an impact point, such as a constantly-wiping cam profile, an abrading latch surface, abrading pivot surfaces, an impacting guide surface, or the like. By contrast, the invention provides a flexure punch actuator with none of these troublesome wear points. The invention provides such an actuator simply by means of a novel set of cantilevered flexure bars which may be non-abradingly reciprocated, selectively, but in unison and in common by a novel reciprocating drum. Adjacent the free tip of each flexure bar the thrusting element (punch knife), is coupled. By this arrangement the flexures are efficiently and guidingly reciprocated in mutual synchronism and their driving thrust is applied most efficiently from their tips.

The flexure actuators of the invention also include magnetic retaining and release means, eliminating the customary mechanical latches which introduce many undesirable wear surfaces. Such latches are prone to malfunction and fail through wear, are noisy, and are unnecessarily complex, requiring means to engage them with the drive linkage. By eliminating such latches, record punches according to the invention may thus be fabricated more simply with fewer parts, less expensively and may also dispense with lubrication of these wear points. Conventional "latched" punches constantly wipe the latch surfaces, clicking them noisily, even when the punches are not "selected." The invention in remaining latches also leaves the punch elements untouched (and thus silent) when not selected and provides a quieter, longer-lived machine. Moreover, by eliminating latches, the invention also leaves the tips of the punch actuators free for coupling punch knives there and further, permits pairing two such punch arrays, abutted at their tips, to thus facilitate "two column punching"—something barred by "latched" arrangements interposed between punch-sets at this "tip-area". Thus, workers in the art will recognize that the invention can improve punching reliability, especially at the high speeds characteristic of data processing systems, can increase machine (actuator) life and reduce maintenance, and can increase actuating efficiency and greatly reduce punching noise.

According to a further improvement, such latch-replacing magnetic retaining means comprises a "constantly-ON" retainer magnet (which may be common to a set of flexure bars) and, for each bar, a release winding to override the magnetic retention flux (bucking field) sufficient to release a flexure bar for punching.

Besides the aforementioned problems, workers in the art of designing punch mechanisms have long striven to transmit actuating energy to the puncher more efficiently. Prior art systems having the aforementioned wear points and attendant frictional losses obviously degrade such efficiency. Moreover, such systems will provide a constant drag on a spring actuator, by loading the punch knives thereon. Thus, punch mechanisms according to the present invention can punch more efficiently with the punches coupled to a driving flexure without significantly loading it down and without requiring interfering latch couplings or the like. Where prior art systems will typically drive an actuator bar intermediate its length, the invention is arranged to drive it from the tip, to thus increase efficiency, enable double-row punching and the like.

Accordingly, it is an object of this invention to provide the aforementioned and related features, advantages and solutions. Another object is to provide a flexure actuated record impacting arrangement having no significant wear zones, no abrading surfaces, no impact points or the like. Still another object is to provide such an arrangement having a greatly reduced noise level. Yet another object is to provide this arrangement using fewer and simpler parts. Another object is to provide this arrangement requiring no lubrication or repair over extended life. A further object is to provide such an arrangement having a superior energy-transmission characteristic and improved reliability, especially at high actuating speeds and as associated with card punch mechanisms and the like. A still further object is to provide such an arrangement in a two column punch. Another object is to provide therewith magnetic retainer means, dispensing with mechanical latching means or associated controls.

Another object of the invention is to provide a reciprocating actuator assembly in the form of a flexed resilient self-actuating bar coupled to a driven element and to reciprocation means with no significant abrading wear surfaces. A more particular object is to provide an array of such bars in an integral structure with matched flexure characteristics and the like. Another object is to provide such an assembly and reciprocation means so as to control the reciprocating flexing and to induce self-stripping action thereof with a common reciprocator means non-frictionally engaged therewith. A more particular object is to provide such an assembly including a reciprocating drum journaled on an eccentric drive, while being restrained from rotation therewith. A further object is to provide such an assembly wherein such a flexure-bar array includes one or more idler flexure-bars constantly engaged with such a drum to provide such restraint. A still further object is to provide such an assembly wherein such actuator bars are maintained "off," and out of engagement with such a drum, by a first magnetic means and also are selectively released for such drum engagement by a second magnetic means provided for each such bar to nullify the retaining force of the first magnetic means, sufficient for this "selection release." A further object is to provide such an assembly requiring no timing or synchronizing means beyond that for synchronizing such a drum with such release means. Other and related objects and advantages of the invention will become evident upon consideration of the following description of the best embodiment thereof in conjunction with the accompanying drawings; the scope of the invention being particularly pointed out in the appended claims.

Briefly characterized, the subject invention is embodied preferably in an improved two-column card punch assembly including two columnar arrays of punch knives and a multi-tined flexure comb operatively arranged with each such array so that each knife is simply coupled to the tip of a respective flexure bar tine, each set of tines being provided with a solenoidal retainer magnet to hold them disengaged and each tine further being provided with its own magnetic release solenoid to nullify the retainer magnet attraction, selectively at "punch-time" when a tine is "selected," the tine being flexed by this magnet so it will snap down against a reciprocator drum to be actuate-guided and returned thereby. This drum is journaled on an eccentric drive to be reciprocated thereby also being restrained against rotation so the selected tines engaged thereagainst may follow it, in unison, through prescribed punching and stripping motions while kept flexure-biased against the drum.

Figures 2, 3:
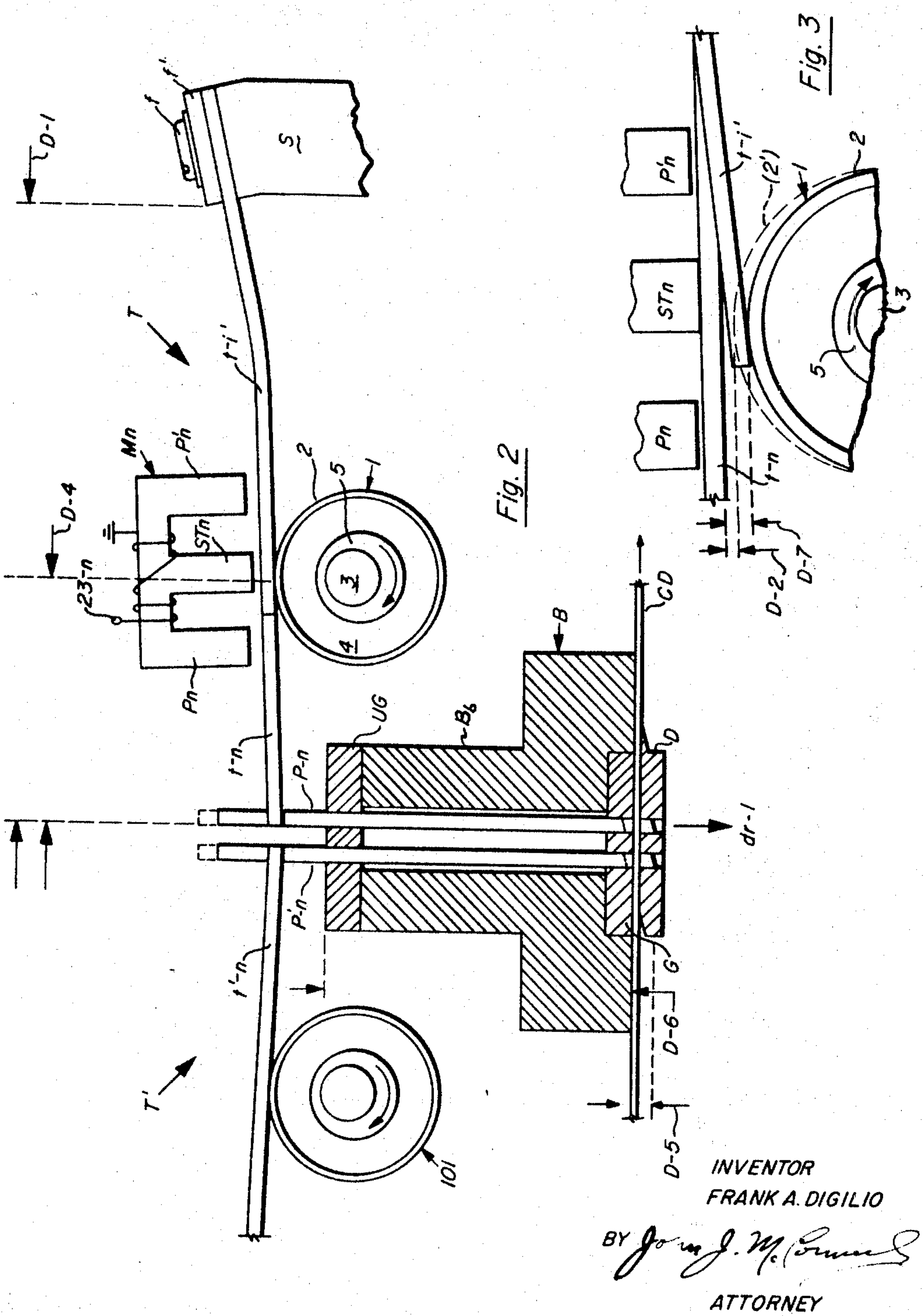

In the drawings, wherein like reference numerals denote like parts:

FIGURE 1 is a greatly simplified perspective of the preferred embodiment of the invention comprising a single-column resilient punch actuator, i.e. a set of flexure bars fashioned from a single flexure plate, each bar being adapted to selectively actuate one punch in a column;

FIGURE 2 is a fragmentary sectional side view of a two-column punch arrangement including an abutting pair of comb actuators, each like that in FIGURE 1, and also including associated mounting means, magnetic retainer/release means, and reciprocator means, the latter being indicated as in the "Down" (punch) phase; and FIGURE 3 is an enlargement of a portion of FIGURE 2, illustrating a reciprocator means in the "Up" phase.

Referring now to FIGURES 1–3, a multi-flexure actuator member, namely a flat, multi-tined flexure comb, is provided for actuation of each columnar set of punches, e.g. comb T for punch knives P–1 through P–*n* and comb T′ for the adjacent set P′–1 through P′–*n* (only P′–*n* shown). Each comb has a plurality of tines, or flexure bars *t*, and is fastened to the stationary frame S of the punch machine in a prescribed attitude by suitable mounting means, such as with a clamp *f′* held by clamping bolt *f*, or the like. Each comb includes idler tines (*t–i*, *t–i′* on comb T), preferably two, and, inboard thereof, a number of like, integral, punch-actuating tines, or punch bars, such as *t*–1, *t*–2, etc. through *t–n* on comb T. One punch bar is provided for, and operatively (actuatingly) coupled with, each punch in a columnar set (e.g. *t*–1 through *t–n* for P–1 through P–*n*, respectively). Combs T, T′ may be composed of a suitable strong, resilient metal, such as spring steel or the like, from which tines *t* may be cast, ground, etc. Thus, according to an invention feature, a set of punch bars and idler tines may be so fabricated in an integral structure, all being thereby matched in size, stiffness, composition, etc. and easily mounted, or replaced, as a unit. Each comb is thus cantilevered out from its attachment on frame S to present tines in operative relation with the associated punches and Punches P may be conventionally arranged to comprise to be constantly flexed, e.g. self-biased into engagement with the associated reciprocator drum, as described below.

one or more columnar arrays (two in FIGURE 2) for punching, selectively prescribed rows of one or more card columns, as known in the art. Each punch *p* is coupled, along a reduced, groove portion *n* thereof, to a respective slot *s* of the associated punch bar *t*, as indicated in FIGURE 1. The punch bars will be seen to be kept normally-inoperative, being retained so by a retainer magnet means such as $M_N$, to be released, when selected, for self-acting engagement against a reciprocator (drum) assembly 1, to be guided through the punch cycle thereby, Each punch thereby impacts an associated portion of a record (card CD), being aligned therewhile and maintained on the respective punch tine by a punch guide block B. In the embodiment shown, each punch comprises a rigid metal bar having groove *n* cut out at the free, non-punching end thereof, this groove being adapted to closely engage (as assembly tolerances permit) a (surrounding) notch *s* in a respective punch bar *t*. Slots *s* may be cut only as deep as required to receive punches *p*, with a slight tolerance being provided to accommodate minor shifts along cantilever direction *dr*–2 (bar length) in case the pivot arc of the bar is not sufficiently flat, though a long effective cantilever length D–1 and relatively small punch-actuation excursion D–5 can practically eliminate this.

Punches *p* are guided for actuation by suitable guide means, such as aforesaid guide block B, comprising a conventional lower punch guide G, known in the art, and spaced therefrom a prescribed spacing D–6, a like upper guide UG. Upper guide UG helps to maintain the punches registered with their appropriate associated slot in die D during punching excursions and stabilizes them. Guides G, UG are mounted spaced apart sufficient to stabilize the long punches and to retain them in their respective bar-slots *s*, according to a feature of the invention. Bridge B is thus preferably arranged to mount guides G, UG for two sets of rather elongate punches (*p*, *p′*) in registry with their dies (D) for a more stable thrusting alignment thereof when actuated by respective punch bars *t*.

According to another feature, a reciprocating assembly is provided for each comb (e.g. assembly 1 for punches *p*–1 through *p–n*), being maintained in non-sliding, tine-biasing engagement against idler tines *t–i*, *t–i′* (and punch bars *t*–1 etc., when released) so as to guide the punch bars down in punching unison along punching direction *dr*–1 and urge them back in stripping unison against their own bias. Assembly 1 (assembly 101 for actautor comb T′ is similar) includes a reciprocator drum 2 journaled on a bearing assembly 4 carried rotatably on a constantly rotated eccentric drive comprising a constantly driven shaft 3 including an eccentric cam shaft portion 5 or the equivalent, for reciprocation of drum 2. Drive assembly 1 is biasingly disposed relative the tines of associated flexure comb T so that idler tines *t–i*, etc. are constantly biased into flexed engagement against the surface thereof throughout its period of reciprocation; i.e. between the upper "Start" position (or "Up" phase, per full line showing in FIGURE 3) and the lower "punch" position (or "Down" phase, per full line showing in FIGURE 2). The vertical drum excursion, D–3, along punch direction *dr*–1, will depend upon the required punching excursion to drive punches *p*, etc. through die D in a particular arrangement, being a function of such known parameters as the punch "rake" (toe-heel canting, typically about 30 mils, for about 3–4 lb. thrust) thickness of record medium distance through dies necessary coupling tolerances and clearances, etc. as well as the overhang, or leverage (D–4) of the punch on its punch bar, i.e. the distance beyond the point of engagement with drum 2. For conventional punched cards, using conventional dimensioned dies, etc., and a convenient dimensioned reciprocator assembly, a punch excursion (D–5) of about 0.125″ will be found satisfactory, the drum excursion D–3 being proportionately less.

Of course, a like drive assembly 101 is understood as provided for adjacent companion comb T′ actuating punch set *p*′ operatively associated therewith. The two sets of punches may thus be advantageously abutted (for two-column punching) and also use common guide bridge B, dies D, etc. according to this feature of the invention. This is facilitated by the aforedescribed coupling of the punches on the free tips of the flexure bars unhampered by mechanical latches there. Similarly, both drive shafts (e.g. shaft 3) may be driven in common, e.g. by a flat belt driving one shaft and an inter-coupling timing belt.

It will be seen (below) that when not retained "Up" by an associated retainer magnet such as $M_n$, each punch bar *t*–1 etc. in a set will flexingly follow the engaged surface of drum 2 throughout the Up/Down reciprocation thereof, being biasingly flexed toward the drum for continual, positive engagement thereagainst. Drums 2 etc. can thus guide all the punches in a set through punch die D and back self-strippingly and in synchronized unison. Thus, it is a feature of the invention that a set of unitarily-projected flexure bars are conjunctively oscillated up and down against their own flexing bias by a reciprocated drum, the drum being kept in constant non-sliding (non-rotational) engagement therewith by idler flexure bars.

Thus, with reference to the elements in FIGURE 2, reciprocator drum 2 engaged non-rotatingly by constantly flexed idler tines *t–i*′ (*t–i* not shown here) and with shaft 3 kept continually rotating, the selection and release of a punch bar (e.g. *t–n*) from engagement against associated magnet $M_n$ (as indicated in FIGURE 2) will be understood to involve the following operation. At the "Up" (start) portion of the reciprocator cycle (full-line FIGURE 3 and phantom FIGURE 2), the selected bar *t–n* will snap down from engagement with magnet stop ST–*n* across retainer gap D–2 to engage drum 2 (phantom FIGURE 3). Gap D-2 is kept very small, e.g. about 2–3 mils for magnetic efficiency and also is preferably variable by adjusting the position of the magnet assembly (at least Stop ST–*n* thereof). Since drive shaft 3 rotates continually (see arrow), drum 2 will thereafter descend, over a somewhat elliptical path (sinusoidal, simple harmonic, motion) to arrive at its lowermost ("Down" or actuating phase) position 2′ (FIGURE 2) being kept from rotating with drive cam shafts 3, 5 by idler tines *t–i*, *t–i*′ and bearing 4. Tines *t–i*, *t–i*′ are pre-biased sufficiently against drum 2 so that their frictional engagement prevents it from so rotating while bearing 4 allows rotating of shafts 3, 5 nonetheless, according to another feature of the invention.

Thus, it will be understood that flexure comb T is clamped in position on frame portion S at vertical and horizontal distances from the record punching zone (CD) so as to locate the prescribed-length punches *p* in their aforementioned guide die assembly B when retained by the magnetic means (e.g. $M_n$), being angularly disposed there so as to be biasingly flexed for a prescribed flexure force. For instance, this flexing will maintain tines *t* firmly engaged against drum 2 throughout the prescribed excursion D–3 of drum 2, from "Down" position to engagement with the stops ST of magnets M ("Up" position). Associated reciprocator assembly 1 will, accordingly, be located relative comb T to flexingly engage punch bars *t* thereof so as to be frictionally held non-rotating by idler tines *t–i* and so as to guide the punches on released ones of punch bars *t*–1 through *t–n* through the prescribed total punch-excursion D–5 (e.g. about 125 mils, perforating CD about midstroke), establishing lever distance D–4 to suit. Thus, when drum 2 has bottomed in its descent (over distance D–3, to reach position 2′) the "selected" punches *p* on the "released" punching bars (e.g. *t–n* here) will have been thrust, perforatingly through an associated portion of record CD. Thereafter, when drum 2 starts to ascend (since shaft 3 continues to rotate), the aforementioned pre-bias of these "selected" bars will maintain them, followingly, on the drum surface and thus effect a very simple, advantageous "self-stripping" action, according to another invention feature. In the above illustrative embodiment in FIGURE 2, it will be understood that the drawing is primarily propaedeutic and tutorial, for instancee, somewhat exaggerating the distances D, the curvature of tines *t*, etc. Also, it will be understood that the structure and operation of the companion punching unit (i.e. comb T′, punches *p*′, drive assembly 101, etc.) will be similar, this unit being only very schematically shown.

According to an aforementioned feature of the invention, each actuating bar *t–l* through *t–n* has associated therewith a magnetic retaining means such as a permanent magnet for each punch bar (e.g. $M_n$ for bar *t–n* in FIGURE 2). This retainer magnet is adapted to attract the associated punch bar out of engagement with the associated reciprocator drum, thus disabling the associated punch for punching until selection and release thereof. One such retainer magnet or several may be provided for each set of punch bars (*t–l* through *t–n*). As indicated in FIGURE 2, individual magnets are used, each having individual stops ST, pole pieces P, and bucking solenoid windings 23. Each magnet (e.g. $M_n$) may thus comprise a permanently magnetized magnet mounted from the machine frame, having a pair of flux-conserving poles (e.g. $P_n$, $P_n'$) and also preferably including stop means (such as stop projection S*t–n*) of wear-resistant material, to protect the "typically-soft-iron" pole tips from abrading or deforming engagement with the associated bar (e.g. *t–n*). The permanent magnet strength is thus arranged to be sufficient to attract the bar across gap D–2 against its own flexed stiffness to engage stop ST in "Rest," non-selected position for selective punching release therefrom. Because they are "set-back" from stop ST (e.g. a few mils) poles will operate over a gap slightly larger than D–2 (e.g. 4–5 mils). Thus, each retainer magnet will be disposed, preferably, adjustably, with the faces of its pole tips relatively parallel to the associated punching bar *t* and spaced therefrom a relatively minor gap when drum 2 is in the "Up" position (FIGURE 3). Of course, other attracting means, such as electromagnets, may provide such a retaining force as known in the art, though this "constantly-ON" permanent magnet is preferred, e.g. being economical, fail-safe, etc.

It will be apparent that, according to another feature of the invention, such a magnetic retainer assembly may also be conveniently provided with magnetic release means for allowing a "retained" bar to drop (snap down of its own inherent resilience) when "selected" for punching. Thus, according to this feature of the invention, a bucking solenoid winding such as 23–*n* may be provided for each set of retainer permanent magnet poles P to be energized with a prescribed release (select) current for releasing a selected bar by bucking (cancelling out, or nullifying) the retaining flux from the aforedescribed permanent magnet poles P. This release will be understood as timed (by known means) to correspond with the "Up" phase of drum 2, i.e. at prescribed "select-times."

Thus, as to operation, it will be apparent that the non-selection of a bar *t* will mean that no such bucking current pulse will be applied through the associated winding 23 at a corresponding "select time," the bar being held engaged against stop ST by the associated permanent magnet (e.g. $M_n$) while drum 2 traverses the subject punching cycle. On the other hand, when punching is to be done by the punch associated with a particular punch bar, this punch may be "selected" simply by applying such a "release" current pulse through the associated solenoid winding (e.g. winding 23–*n* for magnet $M_n$ at this "select time" portion of the subject punch cycle allowing the selected flexure bar *t–n* to then snap down onto drum 2. At any "select-time" all such "selected" punch bars will thus snap down to be guided in unison and synchronously thrust their associated punches $p$ through record CD and thereafter be returned (stripped) by drum 2 operatively adjacent their respective magnet poles at "Up" position, i.e. at "select-time" for the following punch cycle. If a returning punch bar is not "selected" for punching during this following cycle, the permanent magnet field from its associated poles P will then disengage it from drum 2 snapping it up against associated stop ST to be so retained during this cycle. On the other hand, another "release" current pulse may be applied to the associated solenoid winding 23–$n$, at this following select time, to keep the bar engaged with drum 2 for this next punch cycle (or return it so, if it had been pulled up by the retainer magnet).

It will be apparent that according to this feature of the invention, the inherent resilience of the actuator tines $t$–1 etc. will keep them engaged with drum 2 to be guided, in synchronism, during punch-actuation and return therefrom. This inherent resilience provides inherent, self-biasing thrust energy. The only timing requirement in such an improved punch mechanism is that the "selection" (release) signal pulse be applied to a "selected" winding during a period which allows the associated punch bar to snap into engagement against drum 2 in "Up" position (minimizing gap D–2) and which persists long enough so that the permanent magnetism of associated latch poles P cannot pull it back, until the drum returns to "Up" ("Start") position. These release signals may thus be conveniently synchronized with the phase of the drive shaft 3 or otherwise by known means. It will also be appreciated that such an arrangement self-thrusting flexure actuator means, supported by non-frictional reciprocator means and the like, derives several significant advantages. As stated, mechanical latches are eliminated; other frictional abrading elements are dispersed with; requirements for power and related controls are consequently diminished (e.g. for "latching-up" gap D–2). Timing requirements are also reduced, e.g. the timing of the release signals (selecting one or more punches, in a set, to be actuated during a particular punch phase) is not critical as to starting time or duartion so long as a positive release is assured so that the punch tine engages drum 2 reasonably smoothly. Note also that no latch timing is required (for releasing mechanical latch means) as heretofore, the solenoid release signals being applicable during "Select" time in phase with, and controlled by, the drive assembly (i.e. 1 or 101).

For a given flexure comb T, having certain vibrational frequency, stiffness and related characteristics, the design of an associated cam drum 2 can be so arranged as to size, location, velocity of rotation, etc. that when punches $p$ have perforated the subject record CD, the surface of drum 2 will gently urge the associated punching flexure tine returningly to be flexed back to "Up" position and thus smoothly, efficiently, and automatically, withdraw the associated punch. This eliminates separate stripper-actuators, related timing controls, and the like. It will be appreciated that such an arrangement greatly simplifies punch head construction; that it eliminates the frictional wear points that are disastrous to machine life; that it is simple and inexpensive to fabricate, and to maintain (for instance, requiring no lubrication and experiencing no significant abrasive wear throughout its life.) Such an arrangement is capable of operating reliably (punching) at very high speeds—something increasingly important in the art today. It will be noted as another feature of the invention that these are no abrading cams, cam-following surfaces or the like (e.g. to engage punch bars $t$–1 etc.) unlike related prior art ararngements. It will also be noted that flexure tines $t$ may be coupled with their associated punches $p$ adjacent their free tips, unlike many prior art arrangements where, for instance, a punch-actuating lever must be engaged with mechanical latching means. It will also be noted that synchronism of punch translation is assured since all actuating flexure tines ($t$–$i$ through $t$–$n$) for a set of punches will follow the same guiding reciprocator drum profile, as they thrust their punches through the record.

The foregoing has shown and described the preferred embodiment of the invention setting forth the best mode contemplated of carrying out the invention in terms which enable one skilled in the relative art to make and use it. However, it will be apparent that changes may be made in the forms of the apparatus disclosed without departing from the spirit of the invention as set forth in the appended claims and in some cases, certain features may be used to advantage without a corresponding use of other features.

Having now described the invention, what is claimed as new and desired to secure by Letters Patent is:

I claim:

1. In a punch apparatus for selectively perforating data processing records and including a frame, a punch station supported by said frame and adapted to locate said records in punching orientation, guide means and a plurality of reciprocable punches, each being disposed in said guide means and adapted to be selectively actuated from a normal "start position" to a prescribed "punch position" at said station through an associated portion of said records thereon, the improvement therewith of flexure actuator means for so reciprocating said punches selectively and non-abradingly, said actuator means comprising in combination:

flexure drive means comprising a set of flexure bars, each bar being drivingly coupled to a respective one of said punches;

fastening means affixing one end of each of said bars, in common, to said frame so that the other end thereof comes couplingly adjacent a respective one of said punches, said fastening means being adapted to maintain said bars cantilevered out in a relative coplanar manner so as to normally present said punches in operative punching position at said station;

reciprocator means rotatably journaled from said frame and adapted to be periodically oscillated in engagement with selected ones of said flexure bars for guiding thereof in unison between "out" and "in" bar positions corresponding to said "start" and "punch" positions of said punches thereon, said reciprocator means being disposed relative said bars so that said bars are constantly flexed and pre-biased in a prescribed manner when engaged therewith; and magnetic retainer means associated with each said bar, being mounted from said frame to retain said bars normally adjacent said "out" positions thereof and being adapted to attract said bars into engagement therewith from said "out" positions, said retainer means also including selectively operable release means associated with each said bar and adapted to effectively nullify said attraction for releasing therefrom to flex itself into engagement with said reciprocator means at a prescribed "start time" corresponding to said "out" position thereof, all said bars, when so released, being depressed self-flexingly guided solely under the control of said reciprocator means.

2. The combination as recited in claim 1 wherein said bars are formed to comprise an integral flexure plate; wherein said flexure drive means also includes idler flexure means formed integrally with said plate and adapted to be kept in constant engagement with said reciprocator means to prevent scraping translations thereof relative engaged ones of said bars; and wherein said reciprocator means comprises a cylinder rotatably mounted from said frame and adapted to reciprocate, without rotation thereof, being so engaged by said idler flexure means.

3. The apparatus as recited in claim 1 wherein said actuator means comprises:

a flat, multi-tined flexure plate means fixed at one end to said frame and presenting, at the other end, a plurality of relatively coplanar flexure tines; each of said punches being loosely coupled on the free end of a respective one of said tines so as to be normally presented thereby into said punch position; a cam shaft journaled in said frame; a drum rotatably mounted on said shaft to be continually reciprocated thereby in the direction of said punch reciprocation; drum retainer means frictionally engaging said drum for preventing the rotation thereof relative said shaft; said shaft being disposed relative said tines so that the surface of said drum may flexingly engage said tines throughout said reciprocation and so as to position said punches at said prescribed start and punch positions at respective out and in phases in the reciprocation cycle thereof; magnetic hold means provided in operative attracting relation with said tines when the tines are flexed into said "out" position and adapted to normally attract said tines thereagainst, said hold means also being provided with a plurality of magnetic release means, each being operatively associated with a respective one of said tines and adapted to be selectively energized so as to release said associated tine from said attraction of said hold means so as to flex itself into engagement with said drum at prescribed select times, corresponding to said "out" phase.

4. The combination as recited in claim 3 wherein said drum retainer means comprises flexure means projected integrally from said flexure plate means and flexed against said drum so as to frictionally engage it for preventing appreciable rotation thereof relative said shaft and relative those of said tines engaged therewith; and wherein said release means each comprises a solenoid coil operatively disposed on said magnetic hold means adjacent said respective tine and adapted, when energized, to provide a bucking magnetic flux for so releasing said tine.

5. In a high speed data processing apparatus for selectively impacting a plurality of freely-reciprocable driven elements against related portions of a record medium, each element being adapted to be selectively reciprocated along a prescribed associated thrust direction between extheme "START" and "END" positions, said arrangement including a stationary frame, the combination therewith comprising:

elongate flexible beam member associated with each said element, each said member being mounted from a portion of said frame so as to be cantilevered out from said portion somewhat along a common plane to be drivingly coupled, adjacent the tip thereof, with a respective one of said driven elements for actuation thereof along said thrust direction and return;

magnetic retainer means disposed and adapted to magnetically attract each said beam member, intermediate the length thereof, so as to flex it relative transverse said elongate axis thereof and engage it in a prescribed, extreme "off" position, said beam member being beam-deflected and flexingly-stressed a maximum in said "off" position;

release means provided fo reach said beam member and adapted to overcome said attraction of said retainer means sufficiently for release therefrom, under the internal pre-flexed bias of the member;

continually oscillating reciprocator means disposed to non-abradingly engage all said beam members intermediate the ends thereof when so released so that said members are, then, spaced from said retainer means by a prescribed minor gap distance, said reciprocator means being adapted to reciprocate said beam members relatively transverse the elongate axes thereof so that said associated driven elements may be so reciprocated guidingly and in unison; between said positions, said beam members being so mounted from said frame as to be constantly flexed against said reciprocator means during said reciprocation.

6. The combination recited in claim 5 wherein said reciprocator means comprises a continually oscillating cam drive means and a drum rotatably coupled with said drive means to be reciprocated thereby along said thrust direction, said drum being disposed to constantly and uniformly flex all said beam members engaged thereby during reciprocating thereof; and wherein flexure drag means is additionally provided comprising at least one flexure beam member frictionally flexed against said drum to prevent appreciable rotation thereof relative said beam members during said reciprocation.

7. The combination as recited in claim 5 wherein said release means each comprises bucking solenoid means adapted, when energized, to nullify said attraction.

8. The combination as recited in claim 7 wherein said retainer means comprises at least one permanent magnet pole piece associated with each said beam member, each said pole piece carrying a respective one of said solenoid means.

9. The combination as recited in claim 5 wherein said apparatus comprises a high speed punch; wherein said driven members comprise at least one columnar-arranged set of punches; wherein said beam members and said drag flexure means comprise a plurality of flexure tines projecting from a common integral comb, one such comb being operatively associated with each said columnar set of punches; all said tines being flexed continually by said reciprocator means when engaged thereby.

10. The combination as recited in claim 9 wherein said reciprocator means comprises a continually oscillating cam drive means and a drum rotatably coupled with said drive means to be reciprocated thereby along said thrust direction, said drum being disposed to constantly and uniformly flex all said beam members engaged thereby during reciprocating thereof;

wherein flexure drag means is additionally provided comprising at least one flexure beam member frictionally flexed against said drum to prevent rotation thereof relative said beam members during said reciprocating;

wherein each said release means comprises a bucking solenoid adapted, when energized, to nullify said attraction; and wherein said retainer means comprises at least one permanent magnet pole piece associated with each said beam member, each said pole piece carrying a respective one of said solenoids.

References Cited

UNITED STATES PATENTS

| | | | |
|---|---|---|---|
| 2,831,355 | 4/1958 | Zimmerman. | |
| 2,999,632 | 9/1961 | Tailleur | 234—109 |
| 3,096,015 | 7/1963 | Bradbury | 234—107 |
| 3,104,053 | 9/1963 | Rabinow | 234—119 X |
| 3,144,988 | 8/1964 | Schulman | 234—109 |

WILLIAM I. PRICE, Primary Examiner

U.S. Cl. X.R.

234—107